United States Patent [19]

Itoh et al.

[11] Patent Number: 4,864,993

[45] Date of Patent: Sep. 12, 1989

[54] BOOST COMPENSATOR

[75] Inventors: Satoru Itoh; Hiroshi Naganuma, both of Higashimatsuyama, Japan

[73] Assignee: Diesel Kiki Co., Ltd., Tokyo, Japan

[21] Appl. No.: 289,704

[22] Filed: Dec. 27, 1988

[30] Foreign Application Priority Data

Jan. 8, 1988 [JP] Japan .................................. 63-597[U]

[51] Int. Cl.⁴ ............................................. F02M 39/00
[52] U.S. Cl. ..................................... 123/383; 123/373
[58] Field of Search ................ 123/383, 382, 373, 449

[56] References Cited

U.S. PATENT DOCUMENTS

| 2,279,048 | 4/1942 | Kittler | 123/383 |
| 3,722,487 | 3/1973 | Ohama | 123/382 |
| 3,981,285 | 9/1976 | Schueler | 123/383 |
| 4,136,656 | 1/1979 | Sokolou | 123/383 |
| 4,176,641 | 12/1979 | Perr | 123/383 |
| 4,359,986 | 11/1982 | Kramer | 123/383 |
| 4,384,560 | 5/1983 | Jäger | 123/383 |
| 4,444,170 | 4/1984 | Hofer | 123/382 |
| 4,449,500 | 5/1984 | Kawatei | 123/383 |
| 4,469,066 | 9/1984 | Yuzawa | 123/383 |
| 4,512,308 | 4/1985 | Hofer | 123/383 |

FOREIGN PATENT DOCUMENTS

| 0106136 | 6/1983 | Japan | 123/383 |
| 59-119944 | 8/1984 | Japan . | |
| 62-156143 | 3/1987 | Japan . | |
| 542956 | 2/1942 | United Kingdom | 123/383 |

OTHER PUBLICATIONS

Jidosha Kogaku, (Automotive-Vehicle Engineering), p. 133, published Mar. 1, 1986.

*Primary Examiner*—Carl Stuart Miller

[57] ABSTRACT

A boost compensator has a valve operative in response to a boost pressure. When the boost pressure is equal to or lower than a setting pressure, the valve intercepts communication between first and second chambers of the boost compensator which are partitioned by a diaphragm. When the boost pressure exceeds the setting pressure, the valve brings the first and second chambers into communication with each other. By the communication, pressure within the second chamber is raised so that the diaphragm and a push rod operatively connected to the diaphragm are moved toward the first chamber. As a result, a control member of a fuel injection pump is caused to be moved in a fuel decreasing direction.

10 Claims, 5 Drawing Sheets

BOOST COMPENSATOR

BACKGROUND OF THE INVENTION

The present invention relates to a boost compensator mounted to a fuel injection pump for supplying fuel to a diesel engine equipped with a supercharger.

It is known well to utilize a supercharger in order to raise output torque of a diesel engine. The supercharger comprises a turbine and a compressor interlocking with the turbine. The turbine is arranged in an exhaust system of the engine, while the compressor is arranged in an intake system of the engine.

The diesel engine is supplied with fuel from a fuel injection pump. It is also known well to equip the fuel injection pump with a boost compensator. The boost compensator is so designed as to adjust a fuel injection amount in proportion to a boost intake pressure or a boost pressure supplied to the engine from the supercharger. Specifically, the boost compensator is so arranged as to determine, in accordance with the boost pressure, a moving range of a control member which is provided in the fuel injection pump for adjusting the fuel injection amount.

The boost compensator has a casing whose interior is partitioned by a diaphragm into first and second chambers. The boost pressure is introduced into the first chamber, while the second chamber communicates with the atmosphere. A spring is accommodated in the second chamber for biasing the diaphragm toward the first chamber. A push rod has one end thereof which is connected to the diaphragm. The control member is operatively connected to the other end of the push rod through a link mechanism. The arrangement is such that when the diaphragm is moved under the action of the boost pressure toward the second chamber against the biasing force of the spring, the push rod is moved in the same direction as the diaphragm, whereby the control member is permitted to move in such a direction as to increase the fuel injection amount.

By the way, when the load is lightened or relieved with the accelerator pedal depressed fully, rotational speed of the engine is raised so that rotation of the supercharger becomes fast excessively and the boost pressure becomes high excessively. These circumstances result in the following inconveniences. That is, first, since the supercharger rotates at a higher speed than the need, a malfunction occurs in the supercharger. Secondly, since the engine output becomes excessive, a malfunction occurs in the engine.

In order to avoid the above-discussed inconveniences, it is known well to provide the exhaust system with a bypass pipe bypassing the supercharger, as disclosed in, for example, the March 1988 issue of "Jidosha Kogaku (Automative-vehicle Engineering)", page 133, published on Mar. 1, 1986. A waste gate capable of being opened and closed by a valve is provided at an end of the bypass pipe connected to the exhaust pipe at a location upstream of the supercharger. The valve is so arranged as to open the waste gate when the boost pressure exceeds a setting pressure, to permit a part of the exhaust gas to flow through the bypass pipe, thereby relieving the energy of the exhaust gas supplied to the supercharger. In this manner, the boost pressure is prevented from exceeding the setting pressure.

A boost compensator having such a function as to prevent the excessive rotation of the supercharger and occurrence of the excessive boost pressure attendant thereupon is disclosed in Japanese Utility Model Application Laid-Open Nos. 62-156143 and 59-119944.

In the boost compensator disclosed in the above Japanese Utility Model Application Laid-Open No. 62-156143, a valve is provided in a wall of a casing defining a first chamber into which the boost pressure is introduced. When a pressure within the first chamber or the boost pressure exceeds a setting pressure, the valve is opened to permit the pressure within the first chamber to escape to the atmosphere, thereby bringing an upper limit of the pressure within the first chamber to the setting pressure. The boost compensator does merely restrict the fueld injection amount on the basis of the upper limit value when the boost pressure rises excessively, but cannot reduce the fuel injection amount positively. Thus, the boost compensator cannot immediately avoid the excessive rotation of the supercharger.

In the boost compensator disclosed in the above Japanese Utility Model Application Laid-Open No. 59-119944, the push rod is formed with a first tapered section, a straight section and a second tapered section tapered in reverse to the first tapered section, which are arranged along the axis of the push rod. The boost compensator has the following function. That is, when the boost pressure is lower than a first pressure value, one end of the link mechanism is in contact with the first tapered section so that the fuel injection amount increases in proportion to a rise in the boost pressure under the action of the first tapered section. When the boost pressure is within a range of from the first pressure value to a second pressure value, the one end of the link mechanism is in contact with the straight section so that the fuel injection amount is maintained constant. When the boost pressure exceeds the second pressure value, the one end of the link mechanism is brought into contact with the second tapered section so that the fuel injection amount decreases in proportion to the rise in the boost pressure. By the decrease in the fuel injection amount, the output of the diesel engine is reduced to relieve the exhaust gas energy, thereby preventing excessive rotation of the supercharger. For the boost compensator, however, the push rod increases in length because the two tapered sections are required to be formed along the axis of the push rod, resulting in such a problem that the boost compensator increases in overall dimension.

SUMMARY OF THE INVENTION

It is an object of the invention to provide a boost compensator which reduces fuel supplied to a diesel engine when boost pressure exceeds a setting pressure, thereby enabling excessive rotation of a supercharger to be prevented and also enabling excessive output of the engine to be suppressed, and which is not large in size.

According to the invention, there is provided a boost compensator mounted to a fuel injection pump for supplying fuel to a diesel engine equipped with a supercharger, the boost compensator comprising:

(a) casing means;

(b) diaphragm means partitioning a space within the casing means into first and second chambers;

(c) port means through which a boost pressure is introduced into the first chamber such that the diaphragm means is biased by the boost pressure toward the second chamber;

(d) spring means accommodated in the casing, for biasing the diaphragm toward the first chamber;

(e) a push rod supported by the casing means for sliding movement relative thereto in interlocking relation to the diaphragm means, wherein a control member for adjusting an injection amount of fuel injected from the fuel injection pump is operatively connected to the push rod, and wherein when the diaphragm means is moved toward the second chamber under the action of the boost pressure, the push rod is moved in the same direction as the diaphragm means so that the control member is permitted to be moved in a fuel increasing direction; and (f) valve means operative in response to the boost pressure, wherein when the boost pressure is at most equal to a setting pressure, the valve means intercepts communication between the first chamber and the second chamber, while when the boost pressure exceeds the setting pressure, the valve means brings the first and second chambers into communication with each other, and wherein by the communication between the first and second chambers, pressure within the second chamber is raised so that the diaphragm means and the push rod are moved toward the first chamber, whereby the control member is caused to be moved in a fuel decreasing direction.

DETAILED DESCRIPTION

Figure 1:
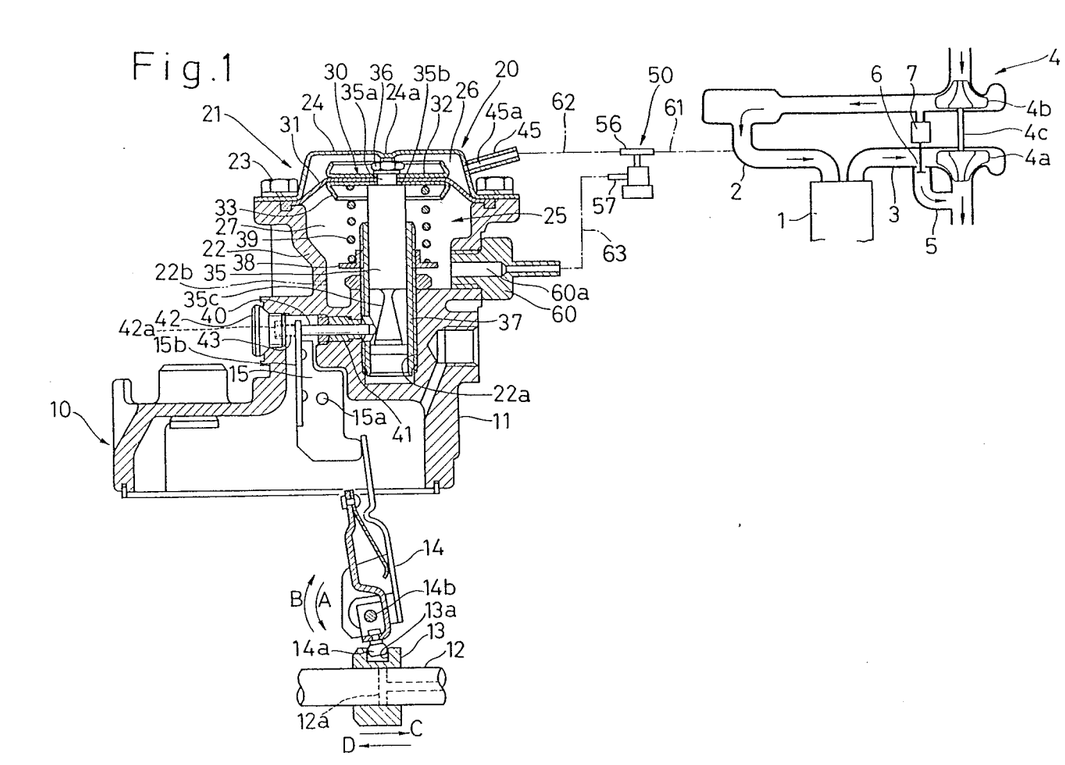
FIG. 1 is a view showing an engine equipped with a supercharger and showing in cross-section a distributor-type fuel injection pump which has a boost compensator according to an embodiment of the invention.

Referring first to FIGS. 1 through 4, in particular, to FIG. 1, there is shown a boost compensator 20 according to an embodiment of the invention, which is associated with a diesel engine 1. An intake pipe 2 and an exhaust pipe 3 are connected to the diesel engine 1. A supercharger 4 comprises a turbine 4a and a compressor 4b. Rotation of the turbine 4a is transmitted to the compressor 4b through a shaft 4c. The turbine 4a is provided in the exhaust pipe 3, while the compressor 4b is provided in the intake pipe 2.

Connected to the exhaust pipe 3 is a bypass pipe 5 which bypasses the supercharger 4. A waste gate 6 is provided at one end of the bypass pipe 5 which is connected to the exhaust pipe 3 at a location upstream of the turbine 4a. The waste gate 6 is opened and closed by a valve 7 into which a boost pressure downstream of the compressor 4b is introduced as a pilot pressure. When the boost pressure exceeds a setting pressure, the waste gate 6 is opened.

In FIG. 1, there is also shown a distributor-type fuel injection pump 10 for supplying fuel to the diesel engine 1. The distributor-type fuel injection pump 10 is known well and, accordingly, only portions having relation to the invention are shown and will be described. The pump 10 comprises a housing 11, only an upper portion of which is illustrated in FIG. 1. Arranged within the housing 11 is a plunger 12 which reciprocates in interlocking relation to rotation of the engine 1 and which is provided with a fuel-spill cut-off port 12a. A control sleeve 13 is fitted about the plunger 12 for reciprocative movement therealong. A stroke of the plunger 12 with the cut-off port 12a maintained closed by the control sleeve 13, in other words, a fuel compression stroke is determined depending upon the position of the control sleeve 13 and, in turn, a fuel injection amount is determined.

The control sleeve 13 is formed with a recess 13a. A pin 14a provided on a lower end of a lever assembly 14 is fitted in the recess 13a. The lever assembly 14 is movable angularly about a pivot 14b. The position of the control sleeve 13 is determined depending upon an angular position of the lever assembly 14. The angular position of the lever assembly 14 is determined basically by the balance between pulling force of a spring (not shown) varying depending upon an amount of depression of an accelerator pedal and pushing force of flyweights (not shown) varying depending upon the rotational speed of the engine 1. When the lever assembly 14 is moved angularly about the pivot 14b in a direction A, the control sleeve 13 is moved horizontally in such a direction C as to increase the fuel injection amount. On the other hand, when the lever assembly 14 is moved angularly in a direction B, the control sleeve 13 is moved horizontally in such a direction D as to decrease the fuel injection amount.

The lever assembly 14 has an upper end abutted against the right-hand side face of a lower end of a stopper 15 by which the lever assembly 14 is restricted in angular movement in the direction A. By the abutment of the upper end of the lever assembly 14 against the stopper 15, movement of the control sleeve 13 in the direction C is restricted and, in turn, the fuel injection amount is restricted.

The stopper 15 is mounted to the housing 11 for angular movement relative thereto about a pivot 15a. A maximum value of the fuel injection amount is determined by an angular position of the stopper 15. The stopper 15 is formed with an operating plate portion 15b.

Mounted to the fuel injection pump 10 is the aforementioned boost compensator 20 which determines the angular position of the stopper 15. The boost compensator 20 has a casing 21 which is composed of a casing body 22 and a cover 24. The casing body 22 is formed on the upper end of the housing 11 of the fuel injection pump 10 in integral relation to the housing 11. The cover 22 is fixedly mounted to an outer peripheral edge of an upper end of the casing body 22 by means of screws 23.

The casing body 22 and the cover 24 cooperate with each other to define a space 25 which is partitioned by a diaphragm assembly 30 into first and second chambers 26 and 27.

The diaphragm assembly 30 has a flexible diaphragm 31, a nut seat plate 32 in contact with an upper surface of the diaphragm 31 and a spring seat plate 33 in contact with a lower surface of the diaphragm 31. The diaphragm 31 has an outer peripheral edge which is fixedly clamped between the peripheral edge of the upper end of the casing body 22 and the peripheral edge of the cover 24.

A push rod 35 has an upper end 35a which is connected to the diaphragm assembly 30. Specifically, the upper end 35a is reduced in diameter and extends through the centers of the respective diaphragm 31 and seat plates 32 and 33 so that the upper end 35a partially projects upwardly from the nut seat plate 32. A nut 36 is threadedly engaged with the projecting portion of the upper end 35a. The diaphragm 31 and the seat plates 32 and 33 are clamped between the nut 36 and a step 35b formed on the push rod 35.

On the other hand, the casing body 22 has a bottom formed therein with a threaded bore 22a. A cylinder 37 is threadedly engaged with the threaded bore 22a and is fixed thereto such than an axis of the cylinder 37 extends vertically. The push rod 35 is fitted in the cylinder 37 for sliding movement therealong.

A spring retainer 38 is threadedly engaged with an outer peripheral surface of the cylinder 37 such that the spring retainer 38 is adjustable in position along the cylinder 37. A compression spring 39 is arranged between the retainer 38 and the seat plate 33 to bias the diaphragm assembly 30 and the push rod 35 upwardly. Upward movement of the diaphragm assembly 30 and the push rod 35 is restricted by abutment of the upper end face of the push rod 35 against a projection 24a formed on the cover 24.

The push rod 35 has a lower portion which is formed into a tapered section 35c so tapered as to converge toward the upper end 35a of the push rod 35. A pin 40 has one end which is faced toward the tapered section 35c. The pin 40 is slidably supported by a sleeve 41 which extends through the wall surrounding the threaded bore 22a. The other end of the pin 40 projects into an upper portion of the space within the housing 11. A screw 42 is threadedly engaged with the wall of the housing 11 at a location facing toward the other end of the pin 40. The screw 42 has an end face formed therein with a recess 42a. A compression spring 43 has one end which is received in the recess 42a, for eliminating play of the stopper 15 and the pin 40. The above-mentioned operating plate section 15b of the stopper 15 has an upper end which is interposed between the other end of the compression spring 43 and the other end of the pin 40. By the compression spring 43, there are obtained contact between the operating plate section 15b and the other end of the pin 40, and contact between the one of the pin 40 and the tapered section 35c of the push rod 35.

Fixedly connected to the cover 24 is a coupling 45 which is made of a straight pipe provided with a pressure-introducing port 45a. As will be described later, the boost pressure within the intake pipe 2 of the engine 1 is introduced into the first chamber 26 through the pressure-introducing port 45a.

The arrangement described above is basically identical with the conventional one. The boost compensator 20 according to the invention further comprises the following arrangement.

Specifically, a coupling 60 having a communication port 60a opening to the second chamber 27 is threadedly engaged with the peripheral wall of the casing body 22.

Figure 2:
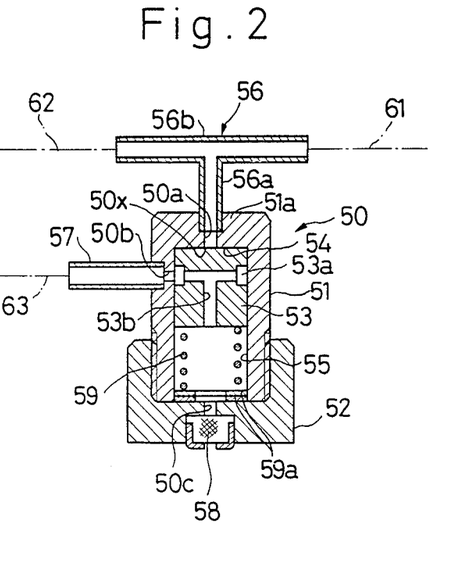
FIGS. 2 and 3 are cross-sectional views respectively showing different positions of a valve used in the boost compensator illustrated in FIG. 1.

A valve 50 arranged on the outside of the casing 21 is so designed as to control communication between the first and second chambers 26 and 27 of the boost compensator 20 and interception of the communication. As shown in FIG. 2, the valve 50 has a body 51 which is tubular in shape and which has an upper end wall 51a. A cap 52 is threadedly engaged with a lower open end of the body 51.

A valve member 53 is accommodated in the body 51 for sliding movement along an axis thereof. A space within the body 51 is divided by the valve member 53 into a pilot-pressure chamber 54 and an atmospheric-pressure chamber 55. The valve member 53 has an outer peripheral surface formed with an annular groove 53a. The valve member 53 is provided therein with a T-shaped passage 53b communicating with the annular groove 53a. A lower end of the T-shaped passage 53b opens to the atmospheric-pressure chamber 55.

The upper end wall 51a of the body 51 is formed at the center with a stepped pressure-introducing port 50a communicating with the pilot-pressure chamber 54. The pressure-introducing port 50a has a lower end whose peripheral edge is substantially formed into a valve seat 50x. A coupling 56 made of a T-shaped pipe has a vertical pipe section 56a whose lower end is fixedly fitted in a large-diameter portion of the pressure-introducing port 50a. A lateral pipe section 56b of the coupling 56 has one end which is connected to the intake pipe 2 through a connecting pipe 61. The other end of the lateral pipe section 56b is connected to the coupling 45 of the boost compensator 20 through a connecting pipe 62. Thus, the boost pressure of the engine 1 is introduced into the pressure-introducing port 50a of the valve 50 through the connecting pipe 61 and the coupling 56, and is also introduced into the first chamber 26 of the boost compensator 20 through the connecting pipe 61, the coupling 56, the connecting pipe 62 and the coupling 45.

The peripheral wall of the body 51 is formed also with a stepped communication port 50b. A coupling 57 made of a straight pipe has one end which is fixedly fitted on a large-diameter portion of the communication port 50b. The other end of the coupling 57 is connected to the coupling 60 through a connecting pipe 63. Thus, the communication port 50b communicates with the second chamber 27 of the boost compensator 20 through the coupling 57, the connecting pipe 63 and the coupling 60.

The cap 52 is formed at its center with a stepped releasing port 50c opening to the atmospheric-pressure chamber 55. The atmospheric-pressure chamber 55 communicates with the atmosphere through the releasing port 50c. A filter 58 is accommodated in a large-diameter portion of the releasing port 50c.

A valve spring 59 is arranged under compression within the atmospheric-pressure chamber 55, to bias the valve member 53 upwardly, that is, toward the pilot-pressure chamber 54. A plurality of shims 59a for adjusting the bias force of the spring 59 are arranged at the bottom of the atmospheric-pressure chamber 55.

Figure 4:
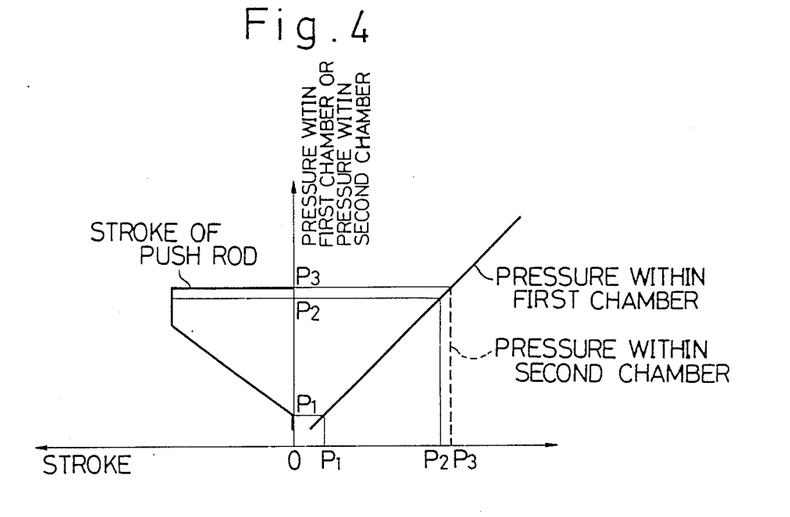
FIG. 4 is a view showing operational characteristics of the boost compensator illustrated in FIG. 1.

The operation of the boost compensator 20 constructed as above will next be described with reference to FIG. 4. In this connection, the below description of the operation will be made on the assumption of a state in which the accelerator pedal is depressed fully or by an amount approximating the full depression whereby the upper end of the lever assembly 14 is abutted against the stopper 15.

Within a range in which the boost pressure introduced into the first chamber 26 exceeds a setting pressure $P_1$, the diaphragm assembly 30 and the push rod 35 move downwardly against the biasing force of the compression spring 39, in proportion to an increase in the boost pressure. The downward movement causes the pin 40 to be moved to the right under the action of the tapered section 35c. Following the movement of the pin 40 to the right, the stopper 15 is moved angularly about the pivot 15a in the clockwise direction as viewed in FIG. 1. The angular movement of the stopper 15 is transmitted to the control sleeve 13 through the lever assembly 14, thereby causing the control sleeve 13 to be moved in the direction C increasing the fuel injection amount.

On the other hand, when the boost pressure introduced into the first chamber 28 is lowered, the push rod 35 is moved upwardly under the biasing force of the compression spring 39, whereby the stopper 15 is moved angularly about the pivot 15a in the counter-clockwise direction. Thus, the control sleeve 13 is moved in the direction D decreasing the fuel injection amount.

When the boost pressure exceeds a setting pressure $P_2$ higher than the setting pressure $P_1$, the waste gate 6 is opened to restrict the exhaust gas energy given to the turbine 4a of the supercharger 4. Thus, the boost pressure can be maintained at a value equal to or lower than the setting pressure $P_2$.

On the other hand, the valve 50 has a setting pressure $P_3$ higher than the setting value $P_2$ of the valve 7 so that when the boost pressure is equal to or lower than the setting pressure $P_3$, the valve 50 is in the state illustrated in FIG. 2. That is, the valve member 53 is abutted against the upper end wall 51a of the body 51 under the biasing force of the valve spring 59 so that the pressure-introducing port 50a is closed by the valve member 53. The communication port 50b communicates with the atmospheric-pressure chamber 55 through the annular groove 53a and the T-shaped passage 53b in the valve member 53. As a result, the second chamber 27 of the boost compensator 20 is intercepted from communication with the first chamber 26 and is brought to the atmospheric pressure.

Figure 3:
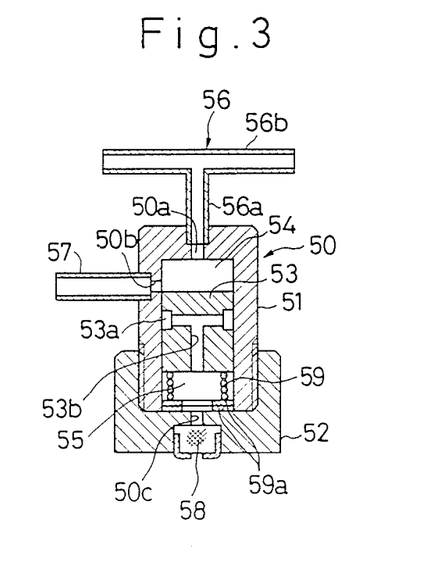

When a malfunction occurs in the valve 7, the boost pressure exceeds the setting pressure $P_2$ of the valve 7. When the boost pressure exceeds the setting pressure $P_3$ of the valve 50, the valve member 53 is moved downwardly against the biasing force of the valve spring 59. At this instant, the pressure receiving area is enlarged at once from the area surrounded by the valve seat 50x to the entire region of the upper end face of the valve member 53. Therefore, the valve member 53 is moved immediately to the position shown in FIG. 3. In the position of FIG. 3, the communication port 50b is intercepted from communication with the annular groove 53a by the valve member 53, so that the communication port 50b is brought into communication with the pressure-introducing port 50a through the pilot-pressure chamber 54. Accordingly, the second chamber 27 is intercepted from the atmosphere, but is brought into communication with the first chamber 26 and the intake pipe 2, whereby the boost pressure is supplied to the second chamber 27 so that the first and second chambers 26 and 27 are made equal in pressure to each other. As a result, the diaphragm assembly 30 and the push rod 35 are immediately moved upwardly under the biasing force of the compression spring 39, thereby causing the control sleeve 13 to be moved in the fuel-decreasing direction. Accordingly, the amount of fuel supplied to the diesel engine 1 is reduced abruptly. In other words, supply of the amount of fuel in proportion to the boost pressure is stopped. Immediately after the stoppage, the rotational speed of the diesel engine 1 is lowered, and the boost pressure is lowered. Thus, it is possible to prevent a malfunction of the supercharger 4 and the diesel engine 1.

In connection with the above, the rotational speed of the supercharger 4 is lowered with the lowering of the rotational speed of the diesel engine 1 due to the decrease in the fuel. When the boost pressure is reduced to a predetermined value lower than the setting pressure $P_3$, the valve member 53 of the valve 50 is returned to the position shown in FIG. 2, whereby the pressure within the second chamber 27 escapes to the atmosphere. As a result, the boost compensator 20 can adjust the fuel injection amount in proportion to the boost pressure.

Figure 5:
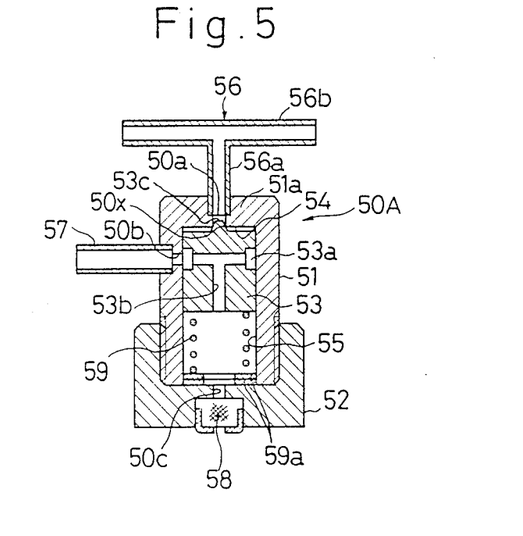
FIG. 5 is a view similar to FIG. 2, but showing a modified valve employed in the boost compensator illustrated in FIG. 1.
Figure 6:
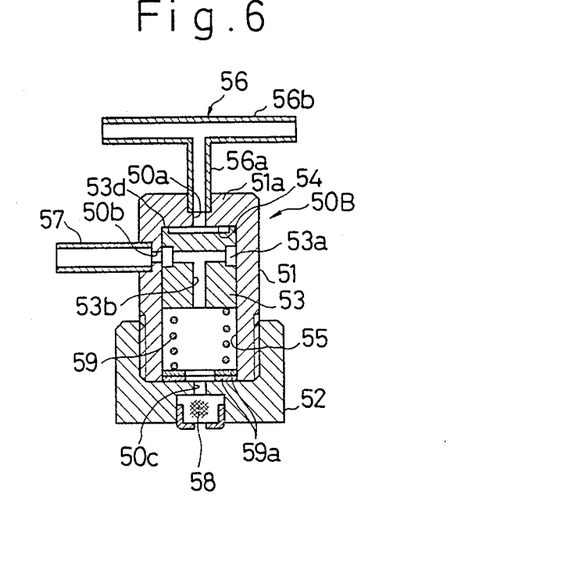
FIG. 6 is a view similar to FIG. 2, but showing another modified view.

FIGS. 5 and 6 show respectively modified forms of the valve for controlling communication between the first and second chambers of the boost compensator and interception of the communication. The basic arrangement of each of the modified valves is identical with that of the valve 50 illustrated in FIG. 2. In FIGS. 5 and 6, components and parts like or similar to those of the valve 50 are designated by the same or like reference numerals, and the detailed description of such like or similar components and parts will therefore be omitted.

In the valve 50A shown in FIG. 5, a tapered projection 53c is formed at the center of the upper end face of the valve member 53. The tapered surface of the projection 53c can be abutted against the valve seat 50x formed at the peripheral edge of the lower end of the pressure-introducing port 50a, thereby securing gas-tightness. Thus, it can be ensured that when the boost pressure is equal to or lower than the setting pressure $P_3$, the pressure-receiving area of the valve member 53 is brought to an area surrounded by the valve seat 50x, making it possible to obtain the characteristics shown in FIG. 4.

Figure 7:
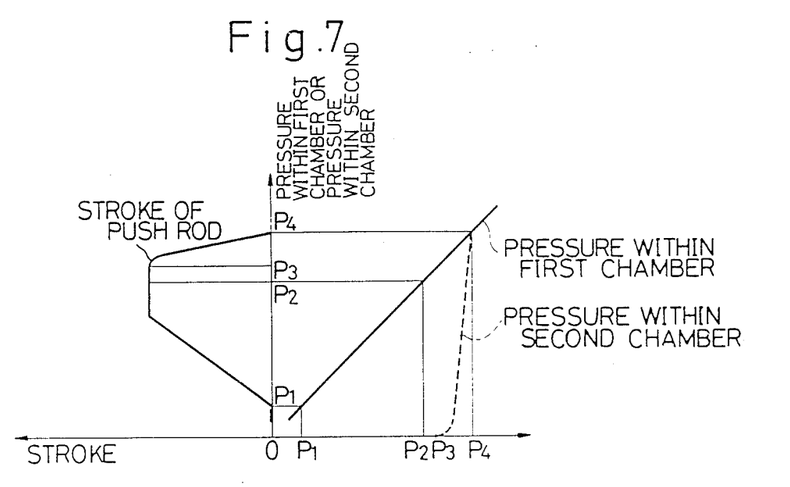
FIG. 7 is a view showing characteristics of the boost compensator which employs the valve illustrated in FIG. 6.

In the valve 50B illustrated in FIG. 6, an annular projection 53d is formed along the outer peripheral edge of the upper end face of the valve member 53. The projection 53d can be abutted against the upper end wall 51a of the body 51 so that the pressure receiving area of the valve member 53 does not largely vary depending upon the position of the valve member 53. In the valve 50B, the position of the valve member 53 is so determined that the downward force due to the boost pressure is balanced with the biasing force of the spring 59. Hereunder, explanation will be made with reference to FIG. 7. When the boost pressure reaches the setting pressure $P_3$, the upper end of the valve member 53 reaches the upper edge of the communication port 50b. When the boost pressure reaches the setting pressure $P_4$ higher than the setting pressure $P_3$, the upper end of the valve member 53 reaches the lower edge of the communication port 50b. Thus, the cross-sectional communication area of the communication port 50b varies within the range of from the setting pressure $P_3$ to the setting pressure $P_4$ of the boost pressure. In the course of a rise in the boost pressure beyond the setting pressure $P_3$, the pressure within the second chamber 27 rises as indicated by the broken lines in FIG. 7, for example, so that the pressure within the second chamber 27 is made equal to that within the first chamber 26. The valve 50B has no hysteresis characteristic, unlike the valve 50 in the embodiment described previously with reference to FIGS.

1 through 4. The operational characteristics shown in FIG. 7 can be obtained also by roughening the upper end face of the valve member 53 and the lower surface of the upper end wall 51a of the body 51 in the arrangement shown in FIG. 2.

On the other hand, in case where the valve 50B is employed, an orifice 22b may be provided in the casing body 22 as indicated by the double dotted lines in FIG. 1. When the boost pressure rises within the range of from the setting pressure $P_3$ to the setting pressure $P_4$, the cross-sectional communication area of the communication port 50b increases in proportion to the rise in the boost pressure, so that the pressure within the second chamber 27 rises. As a result, the push rod 35 is moved downwardly in proportion to the rise in the boost pressure, making it possible to reduce the fuel injection amount.

Figure 8:
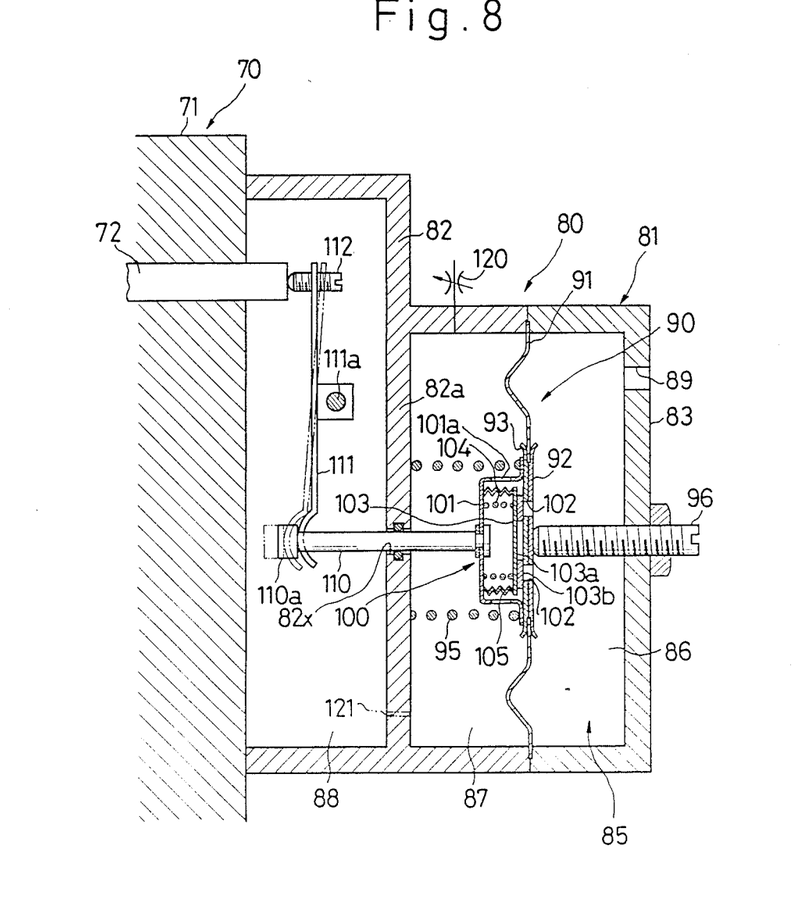
FIG. 8 is a cross-sectional view of an in-line fuel injection pump equipped with a boost compensator according to another embodiment of the invention.

FIG. 8 shows another embodiment of the invention which is applied to an in-line fuel injection pump 70 having a housing 71. In the in-line fuel injection pump 70, a fuel injection amount is determined depending upon a position of a control rack 72 which extends through the housing 71 for sliding movement relative thereto. The control rack 72 is controlled in movement by a governor (not shown) arranged on the left-hand side of the control rack 72. The control rack 72 is restricted in a range of movement by a boost compensator 80 arranged on the right-hand side of the control rack 72. The boost compensator 80 has a casing 81 composed of a casing member 82 and a cover 83. The casing member 82 is provided at its center with a vertical partition wall 82a, and has a left-hand end which is fixedly mounted to the housing 71. The cover 83 is fixedly mounted to a right-hand end of the casing member 82. A space 88 defined by the casting member 82 and the housing 71 communicates with the atmosphere through a bore (not shown) formed in the wall of the casing member 82 so that the space 88 serves as an atmospheric-pressure chamber.

An internal space 85 defined by the casing member 82 and the cover 83 is partitioned by a diaphragm assembly 90 into first and second chambers 86 and 87. The diaphragm assembly 90 has a diaphragm 91 and two plates 92 and 93. The diaphragm 91 has an outer peripheral edge which is clamped between the casing member 82 and the cover 83. The plates 92 and 93 are fixed to each other in such a manner that an inner peripheral edge of the diaphragm 91 is clamped between outer peripheral edges of the respective plates 92 and 93.

A compression spring 95 is accomodated in the second chamber 87 for biasing the diaphragm assembly 90 toward the first chamber 86. A screw 96 is threadedly engaged with the center of the end wall of the cover 83, for restricting movement of the diaphragm assembly 90 toward the first chamber 86. The end wall of the cover 83 is formed with a pressure-introducing port 89 through which the boost pressure is introduced into the first chamber 86.

Arranged within the casing 81 is a valve 100 which is associated with the diaphragm assembly 90 for controlling communication between the first and second chambers 86 and 87 and interception of the communication. The valve 100 has a cup-shaped support member 101 whose open end flange is fixed to the plate 93 of the diaphragm assembly 90. The support member 101 has a peripheral wall formed therein with a bore 101a.

The valve 100 further has a plurality of communication ports or valve bores 102 formed in the plates 92 and 93, a valve member 103 opening and closing the valve bores 102, and a valve spring 104 biasing the valve member 103 toward the valve bores 102. The valve member 103 is accommodated in the support member 101, and is composed of a disc 103a and a plurality of closure elements 103b mounted to the disc 103a. The disc 103a is movable between a position where the closure elements 103b are brought respectively into contact with peripheral edges of the respective valve bores 102 and a position where the closure elements 103b are spaced away from the respective peripheral edges of the valve bores 102. Further, a bellows 105 is accommodated in the support member 101 in such a manner that one end of the bellows 105 is fixed to a peripheral edge of the disc 103a, while the other end is fixed to the bottom wall of the support member 101. The valve spring 104 is arranged within a closed space which is defined by the disc 103a of the valve member 103, the bottom wall of the support member 101 and the bellows 105.

A push rod 110 has one end which is connected to the center of the bottom wall of the support member 101 of the valve 100. The push rod 110 extends through a bore 82x formed in the partition wall 82a of the casing member 82 such that the other end of the push rod 110 projects into the atmospheric-pressure chamber 88. The projecting other end of the push rod 110 is provided with an abutment 110a extending perpenducuclarly to the drawing sheet. On the other hand, a lever 111 is arranged within the atmospheric-pressure chamber 88 for angular movement about a pivot 111a. The lever 111 has a lower end engaged with the abutment 110a by which angular movement of the lever 111 in the clockwise direction in FIG. 8 is restricted. The lever 111 has an upper end with which a screw 112 is threadedly engaged such that the end face of the control rack 72 of the fuel injection pump 70 can be abutted against the screw 112.

With the arrangement described above, when the boost pressure introduced into the first chamber 86 is raised to a value overcoming the biasing force of the compression spring 95, the diaphragm assembly 90 and the push rod 110 are moved to the left as viewed in FIG. 8 so that the lever 111 is permitted to be moved angularly about the pivot 111a in the clockwise direction. As a result, the control rack 72 is permitted to be moved to the right, that is, in the fuel increasing direction. Such operation is similar to the conventional one.

When the boost pressure exceeds a setting pressure of the valve 100, the valve member 103 is pushed against the biasing force of the valve spring 104, to open the valve bores 102. This permits the boost pressure within the first chamber 86 to be introduced into the second chamber 87 through the valve bores 102 and the bore 101a in the support member 101. As a result, the pressure within the first chamber 86 and the pressure within the second chamber 87 are canceled out, so that the diaphragm assembly 90 and the push rod 110 are pushed back to the right under the biasing force of the compression spring 95. Thus, the control rack 72 is moved in the fuel decreasing direction to reduce the fuel supply amount to the diesel engine.

When the boost pressure is lowered by lowering of the rotational speed of the diesel engine attendant upon the decrease in the fuel supply amount, the valve member 103 closes the valve bores 102 under the biasing force of the valve spring 104. High pressure air remaining within the second chamber 87 escapes to the outside gradually little by little through a variable flow-rate control valve 120 connected to the casing 81. After the valve bores 102 have been closed in the manner described above so that the pressure within the second chamber 87 is returned to the atmospheric pressure, the boost compensator 80 can again adjust the fuel injection amount in proportion to the boost pressure.

In connection with the above, in place of the variable flow-rate control valve 120, a mere orifice 121 may be formed in the partition wall 82a of the casing 81 as indicated by the double dotted lines in FIG. 8.

Additionally, the bellows 105 of the valve 100 may, if necessary, be dispensed with in the embodiment illustrated in FIG. 8.

In the above-described embodiments, the valve provided in the boost compensator plays a role of a fail-safe at the time a manfunction occurs in the valve which opens and closes the waste gate in the exhaust system. It is to be noted, however, that the valve in the boost compensator may be employed in order to enable the valve opening and closing the waste gate to be dispensed with.

Furthermore, the setting pressure of the valve provided in the boost compensator may be brought to a value lower than that in each of the above embodiments, such that the first and second chambers are brought into communication with each other within a normal or regular range of the boost pressure. In this case, the valve functions as a compensating device in the control of the fuel injection amount in accordance with the normal or regular boost pressure.

What is claimed is:

1. A boost compensator mounted to a fuel injection pump for supplying fuel to a diesel engine equipped with a supercharger, said boost compensator comprising:
   (a) casing means;
   (b) diaphragm means partitioning a space within said casing means into first and second chambers;
   (c) port means through which a boost pressure is introduced into said first chamber such that said diaphragm means is biased by the boost pressure toward said second chamber;
   (d) spring means accommodated in said casing, for biasing said diaphragm toward said first chamber;
   (e) a push rod supported by said casing means for sliding movement relative thereto in interlocking relation to said disphragm means, wherein a control member for adjusting an injection amount of fuel injected from said fuel injection pump is operatively connected to said push rod, and wherein when said diaphragm means is moved toward said second chamber under the action of the boost pressure, said push rod is moved in the same direction as said diaphragm means so that said control member is permitted to be moved in a fuel increasing direction; and
   (f) valve means operative in response to the boost pressure, wherein when the boost pressure is at most equal to a setting pressure, said valve means intercepting communication between said first and second chambers, while when the boost pressure exceeds said setting pressure, said valve means brings said first and second chambers into communication with each other, and wherein by the communication between said first and second chambers, pressure within said second chamber is raised so that said diaphragm means and said push rod are moved toward said first chamber, whereby said control member is caused to be moved in a fuel decreasing direction.

2. A boost compensator according to claim 1, further comprising piping means through which said first and second chambers communicate with each other, wherein said piping means is arranged on the outside of said casing means, and said valve means is provided in said piping means.

3. A boost compensator according to claim 2, wherein said valve means comprises a hollow body, a valve member accommodated slidably in said body, and a valve spring biasing said valve member, wherein said body is formed with a pressure-introducing port, a communication port and an atmosphere-releasing port, wherein said pressure-introducing port communicates with said first chamber through a part of said piping means, whereby the boost pressure within said first chamber acts upon said valve member so that said valve member is biased in a direction opposite to a biasing direction of said valve spring, wherein said communication port communicates with said second chamber through another part of said piping means, while said atmosphere-releasing port opens to the atmosphere, wherein said valve member is movable between a first position where said communication port communicates with said atmosphere-releasing port, but is intercepted from communication with said pressure-introducing port and a second position where said communication port communicates with said pressure-introducing port, but is intercepted from communication with said atmosphere-releasing port, and wherein when the boost pressure is at most equal to the setting pressure, said valve member is maintained at said first position under a biasing force of said valve spring, while when the boost pressure exceeds the setting pressure, said valve member is moved toward said second position against the biasing force of said valve spring.

4. A boost compensator according to claim 3, wherein said pressure-introducing port of said valve means has one end whose peripheral edge is formed into a valve seat, wherein in said first position, said valve member is in contact with said valve seat so that a pressure-receiving area of said valve member is determined by an area surrounded by said valve seat, and wherein said valve member is in said second position, said valve member is spaced apart away from said valve seat so that an entire area on an end face of said valve member serves as the pressure-receiving area.

5. A boost compensator according to claim 3, wherein said pressure-receiving area of said valve member at said first position is substantially equal to that at said second position, wherein said valve member is maintained at a position where a force due to the boost pressure and the biasing force of said valve spring are balanced with each other, and wherein said communication port has a communication area which varies depending upon the position of said valve member.

6. A boost compensator according to claim 1, wherein said valve means is mounted to said diaphragm means within said casing means.

7. A boost compensator according to claim 6, wherein said valve means includes at least one valve bore formed in said diaphragm means, a valve member arranged within said second chamber for opening and closing said valve bore, and a valve spring biasing said valve member, and wherein said casing means is provided with communication-restricting means for bringing said second chamber into communication with the atmosphere.

8. A boost compensator according to claim 7, wherein said valve means further includes a support member fixedly mounted to a surface of said diaphragm means on the side of said chamber, and a valve spring arranged between said support member and said valve member.

9. A boost compensator according to claim 8, wherein said valve means further includes a bellows arranged between said support member and said valve member, and wherein said valve spring is accommodated in a closed space defined by said support member, said valve member and said bellows.

10. A boost compensator according to claim 8, wherein said push rod has one end connected to said support member.

* * * * *

UNITED STATES PATENT AND TRADEMARK OFFICE
CERTIFICATE OF CORRECTION

PATENT NO. : 4,864,993

DATED : September 12, 1989

INVENTOR(S) : Satoru ITOH et al.

It is certified that error appears in the above-identified patent and that said Letters Patent is hereby corrected as shown below:

In column 13, line 6, after "said" insert --second--.

Signed and Sealed this

Twenty-first Day of August, 1990

Attest:

HARRY F. MANBECK, JR.

*Attesting Officer*    *Commissioner of Patents and Trademarks*